Oct. 15, 1929.  A. L. JOHNSON  1,731,859
METHOD OF MAKING RACKS
Original Filed March 8, 1928  2 Sheets-Sheet 1
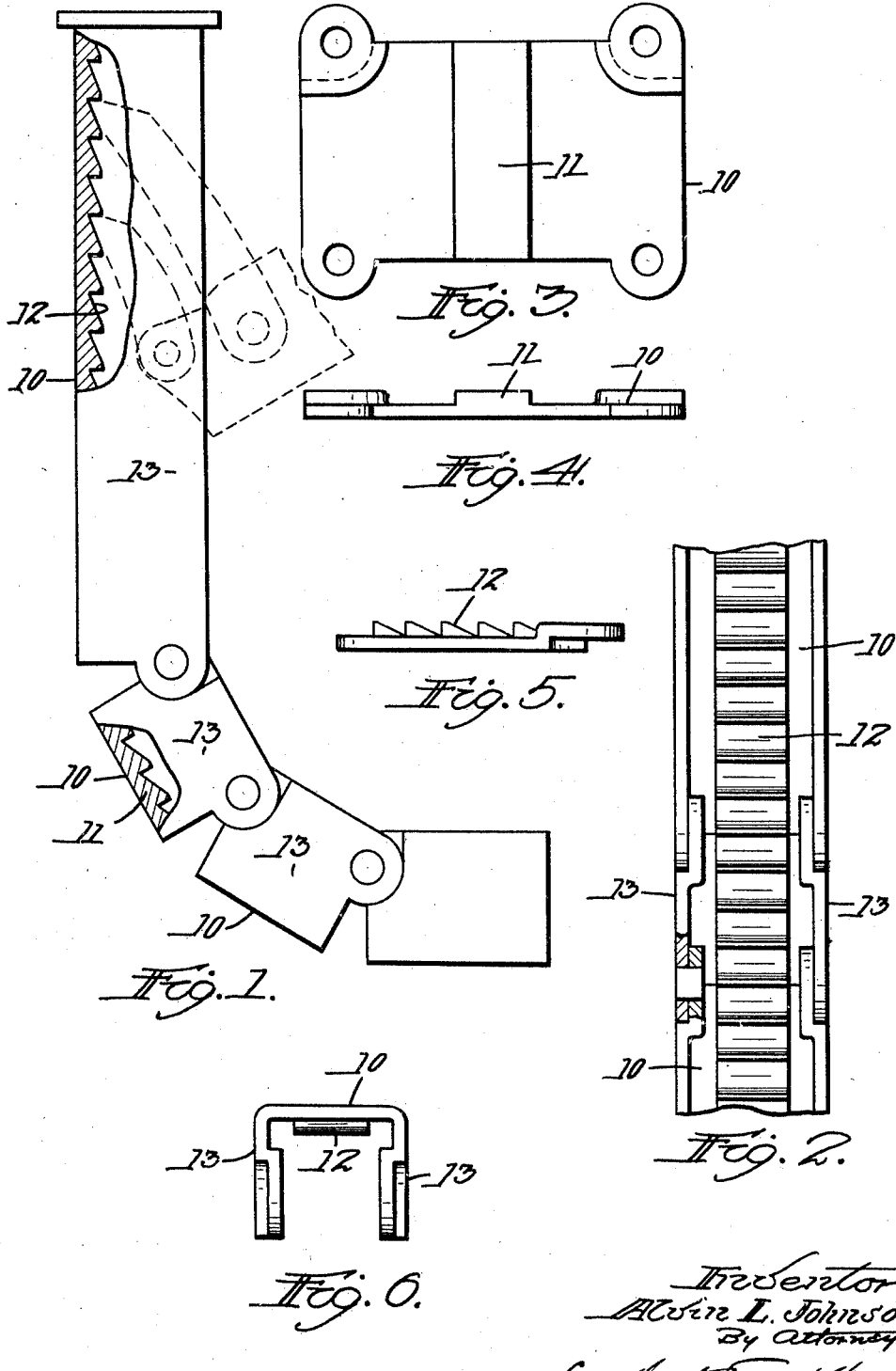

Oct. 15, 1929.  A. L. JOHNSON  1,731,859
METHOD OF MAKING RACKS
Original Filed March 8, 1928   2 Sheets-Sheet 2
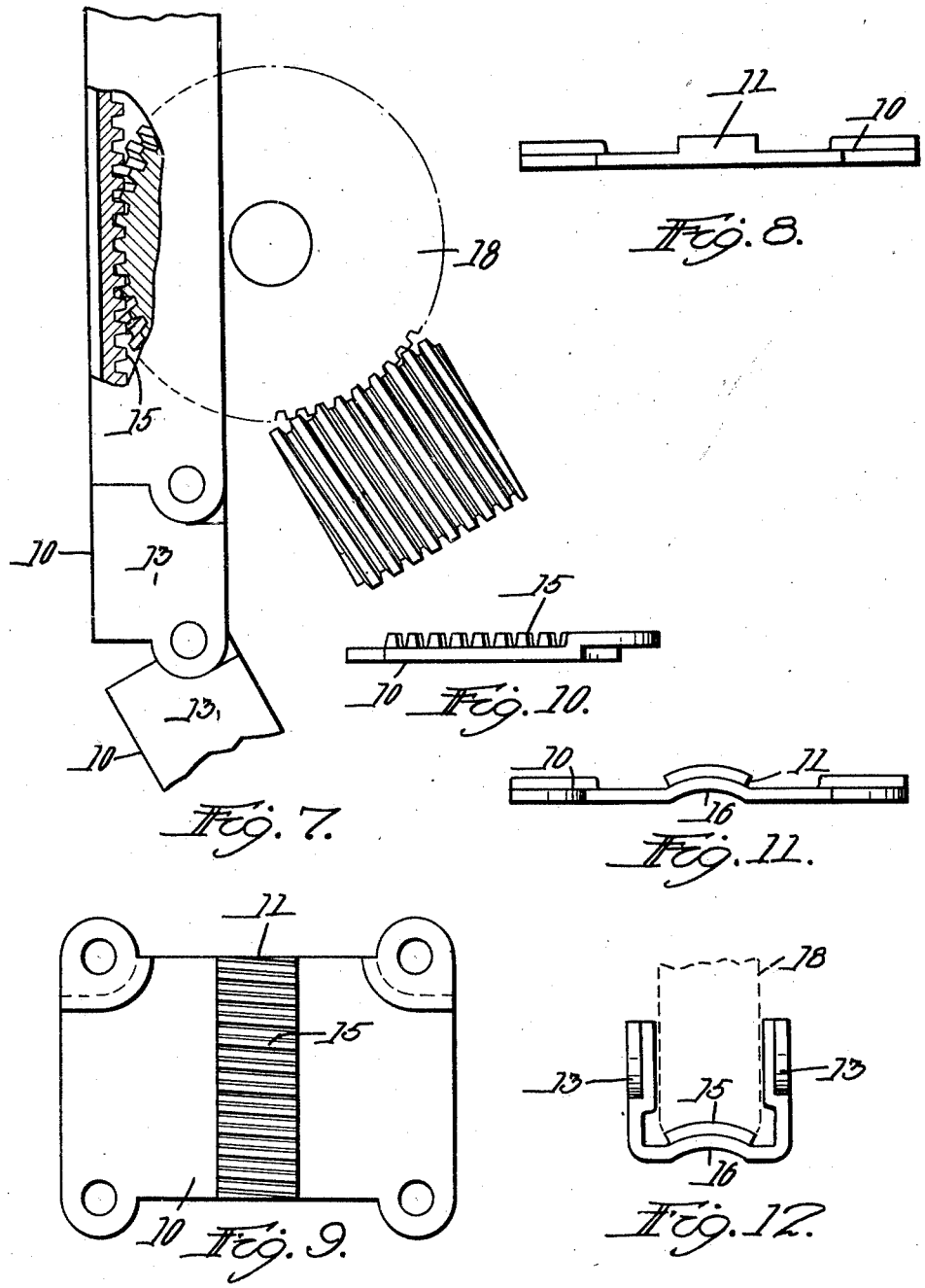

Patented Oct. 15, 1929

1,731,859

UNITED STATES PATENT OFFICE

ALVIN L. JOHNSON, OF WORCESTER, MASSACHUSETTS

METHOD OF MAKING RACKS

Application filed March 8, 1928, Serial No. 260,145. Renewed March 18, 1929.

The principal objects of the invention are to provide an uniform method of manufacturing a pressed steel rack of box shape and cross section having three sides and with the teeth on the surface of the central side and to provide a method of manufacture in which the teeth will be comparatively strong and the provision of the teeth will not weaken the metal at the back of the rack and may be formed as a part of the circumference of a screw so as to work with a worm wheel.

Other objects and advantages of the invention will appear hereinafter.

Reference is to be had to the accompanying drawings in which

Fig.1 is a side view of a rack for an automobile made up of sections hinged together and constructed in accordance with this invention, parts being shown in section;

Fig. 2 is a front view thereof;

Fig. 3 is a face view of the original blank from which one of these sections is made;

Fig. 4 is an edge view of the same;

Fig. 5 is an end view of the same blank after the teeth have been formed upon it;

Fig. 6 is an end view of the complete rack section;

Fig. 7 is a view similar to Fig. 1 of another form in which this invention can be carried out showing a worm wheel for operating the rack;

Fig. 8 is a view similar to Fig. 4 showing the construction at that stage;

Fig. 9 is a plan showing the next operation;

Fig. 10 is an edge view of the blank in the same condition as in Fig. 9;

Fig. 11 is an edge view showing the result of the next operation, and

Fig. 12 is an end view of this form of the rack in its completed state.

In order to understand the process of manufacturing the rack it is shown in its completed form in Figs. 1 and 2 as made up of several sections hinged together and adapted to be actuated by an ordinary pawl construction. This invention has to do with any one of the sections of this rack, by itself and not with the assembly.

In the manufacture of a rack section, a blank 10, preferably of nearly rectangular shape of the desired quality of sheet metal, is cut out and subjected to a rolling mill or drop forging process to give it a cross rib 11 located at the center of considerably greater thickness than the rest of the blank. This blank is then operated upon a second time to provide a series of teeth 12 in the projecting rib 11. The manner of producing the teeth 12 can vary in accordance with the kind of metal being employed. It can be done by a die pressing operation or the teeth can be cut as desired.

When this has been accomplished this blank is placed in dies and the two ends of the blank are turned back at right angles to the blank and parallel with each other. This forms the two flanges 13 spaced at equal distances from the edges of the teeth 12 and the structure is a box like form having one side open and the rack 12 on the inner surface of the back side. These teeth are formed by metal projecting in from the blank and the formation of the teeth does not weaken the blank at any point. As a matter of fact the rack is stronger where the teeth are than anywhere else.

This constitutes a very simple way of making the rack and provides a strong and durable rack in which the pawls can project inside the rack and the bulkiness of the jack employing such a rack is reduced materially over many of the forms now in use.

In the form shown on the second sheet, similar conditions exist. The original blank 10 and projecting rib 11 are the same as in Sheet 1. On this rib are formed teeth 15 which are arranged at such an angle that they could constitute part of a continuous screw thread extending around a cylindrical bolt. The next step is to place this blank in dies and force this rib 11 into a curved shape as indicated at 16 so that it actually does constitute a screw surface with threads thereon. The pitch of these threads can be selected for the purpose of enabling the threads to cooperate with a worm wheel 18 for the purpose of raising and lowering the rack. The next step is to turn up the edges or flanges 13 in the same manner as previously described.

This form of the invention involves all the features shown on Sheet 1 and the additional features of making the so-called rack into a screw thread constituting a part of a screw to permit it to fit the teeth of an operating worm wheel as stated. The advantages above mentioned all apply to this form of rack and it is suitable for use in a different type of jack.

Although I have illustrated and described only two forms of the invention I am aware of the fact that other modifications can be made therein by any person skilled in the art without departing from the scope of the invention as expressed in the claims.

Therefore, I do not wish to be limited in this respect but what I do claim is:—

1. The method of making a rack section which consists in forming a blank of sheet metal of a general rectangular shape, providing it with a rib of extra thickness across the center thereof, forming teeth in said rib extending from one edge of the section to the other and then bending up the ends of the blank on one side to form two sides parallel to each other, thus constituting a rectangular cross section open at the front with teeth projecting from the back toward the front.

2. The method of making a rack which consists in cutting out a blank, providing it with a rib of extra thickness across the center thereof forming teeth in said rib and bending up the ends of the blank to form two sides parallel to each other.

3. The method of forming a rack which consists in cutting out a metal blank with a thickened rib extending across it from edge to edge, forming teeth on said rib at a slight angle to the edge of the blank, and bending said rib to provide a convex surface on the tooth side, the teeth then constituting parts of a continuous screw thread.

4. The method of forming a rack section which consists in providing a substantially rectangular blank of sheet metal with a thickened rib extending across it from edge to edge of the section, forming teeth on said rib at a slight angle to the edge of the blank, shaping said rib to provide a convex surface on the tooth side, and bending the ends of the blank over at right angles thereto to provide the two sides of the rack section parallel to each other, the teeth then constituting parts of a continuous screw thread.

5. The method of making a rack which consists in forming a blank with a rib of extra thickness across the central portion thereof, forming teeth in said rib, and bending up the ends of the blank on the side toward the teeth to form two sides substantially parallel with the rib and with each other.

In testimony whereof I have hereunto affixed my signature.

ALVIN L. JOHNSON.